United States Patent
Junker et al.

(10) Patent No.: US 10,428,699 B2
(45) Date of Patent: Oct. 1, 2019

(54) PIVOT BEARING OF A HYDRAULIC CLEARANCE COMPENSATION ELEMENT

(71) Applicant: Schaeffler Technologies AG & Co. KG, Herzogenaurach (DE)

(72) Inventors: Marco Junker, Obernzenn (DE); Steffen Gumbrecht, Falkendorf (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 308 days.

(21) Appl. No.: 15/473,988

(22) Filed: Mar. 30, 2017

(65) Prior Publication Data
US 2017/0314429 A1 Nov. 2, 2017

(30) Foreign Application Priority Data
Apr. 27, 2016 (DE) .................. 10 2016 207 175

(51) Int. Cl.
*F01L 1/46* (2006.01)
*F01L 1/24* (2006.01)
*F16C 11/06* (2006.01)

(52) U.S. Cl.
CPC .................. *F01L 1/46* (2013.01); *F01L 1/24* (2013.01); *F01L 1/2411* (2013.01); *F16C 11/0623* (2013.01); *F01L 2103/00* (2013.01); *F01L 2810/02* (2013.01)

(58) Field of Classification Search
CPC ... F16C 11/06; F16C 11/0619; F16C 11/0623; F16C 11/0657; F16C 11/0685; F01L 1/46; F01L 1/24; F01L 1/2411; F01L 1/18; F01L 1/185; F01L 2103/00; F01L 2810/02; Y10T 403/32647; Y10T 403/32713; Y10T 403/32721; Y10T 403/32737
See application file for complete search history.

(56) References Cited

U.S. PATENT DOCUMENTS

| 3,787,128 A | * | 1/1974 | Maistrelli | F01B 3/0085 403/122 |
| 4,856,468 A | | 8/1989 | Speil et al. | |
| 5,352,059 A | * | 10/1994 | Ueno | B60G 7/001 280/124.152 |
| 5,499,570 A | * | 3/1996 | Bergelin | B60T 13/52 403/133 |

(Continued)

FOREIGN PATENT DOCUMENTS

| DE | 3725245 | 2/1989 |
| DE | 19505406 | 8/1996 |

(Continued)

*Primary Examiner* — Jonathan P Masinick
(74) *Attorney, Agent, or Firm* — Volpe and Koenig, P.C.

(57) ABSTRACT

A pivot bearing (1) for a hydraulic clearance compensation element (2), especially of a valve train of an internal combustion engine, is provided in which the pivot bearing (1) has a first part (3) projecting in an axial direction (a) with a surface (4) that is convex at least in some sections and also a second part (5) with a surface (6) that is concave at least in some sections for at least partially holding the first part (3). To optimize the production of such a pivot bearing and to minimize the associated costs, the invention provides that the first part (3) is constructed at least partially as a ball, wherein the second part (5) surrounds the ball (3) with undercut in the axial direction (a).

11 Claims, 3 Drawing Sheets

(56) References Cited

U.S. PATENT DOCUMENTS

| | | | | |
|---|---|---|---|---|
| 5,601,378 | A * | 2/1997 | Fukukawa | F16C 11/0638 277/635 |
| 5,758,986 | A * | 6/1998 | Kraps | B60G 7/005 403/122 |
| 5,782,573 | A * | 7/1998 | Dorr | B60G 7/005 403/132 |
| 5,876,149 | A * | 3/1999 | Dorr | F16C 11/0657 277/635 |
| 5,927,891 | A * | 7/1999 | Trumbower | F16C 11/0671 403/114 |
| 5,947,627 | A * | 9/1999 | Uneme | B29C 45/14754 29/898.049 |
| 6,164,829 | A * | 12/2000 | Wenzel | F16C 11/0638 384/203 |
| 6,190,080 | B1 * | 2/2001 | Lee | F16C 11/0638 403/135 |
| 6,527,468 | B1 * | 3/2003 | Lindquist | B60G 7/005 403/122 |
| 6,692,176 | B1 * | 2/2004 | Fladhammer | B60Q 1/06 403/122 |
| 6,901,896 | B2 * | 6/2005 | Yamamoto | F01L 1/22 123/90.43 |
| 7,037,022 | B2 * | 5/2006 | Schonhoff | B60G 7/005 403/114 |
| 7,040,833 | B2 * | 5/2006 | Kondoh | F16C 11/0638 403/135 |
| 7,073,970 | B2 * | 7/2006 | Gercke | B21J 5/006 384/203 |
| 7,322,769 | B2 * | 1/2008 | Heuser | F16C 11/0638 403/133 |
| 7,331,733 | B2 * | 2/2008 | Wolf | B60G 7/001 280/93.511 |
| 7,357,590 | B2 * | 4/2008 | Hoppner | F16C 11/0633 403/122 |
| 7,384,209 | B2 * | 6/2008 | Muders | F16C 11/0614 248/288.31 |
| 8,353,776 | B2 * | 1/2013 | Zhang | F16C 11/0619 403/122 |
| 8,651,852 | B2 * | 2/2014 | Kim | B29C 45/14754 425/261 |
| 8,770,882 | B2 | 7/2014 | Ersoy | |
| 8,894,317 | B2 * | 11/2014 | Maehlmann | F16C 11/0633 403/135 |
| 9,140,294 | B2 * | 9/2015 | Burton | F16C 11/06 |
| 9,227,480 | B2 * | 1/2016 | Jekel | B60G 7/005 |
| 9,278,602 | B2 * | 3/2016 | Kuroda | F16C 11/0657 |
| 9,863,465 | B2 * | 1/2018 | Boston | F16C 11/069 |
| 2007/0212164 | A1 * | 9/2007 | Bosse | F16C 11/0638 403/132 |
| 2009/0196682 | A1 * | 8/2009 | Kuhlman | F16C 11/06 403/133 |

FOREIGN PATENT DOCUMENTS

| | | |
|---|---|---|
| DE | 19950585 | 4/2001 |
| DE | 102008002207 | 12/2009 |
| DE | 102011002592 | 7/2012 |
| EP | 1422429 | 5/2004 |

\* cited by examiner

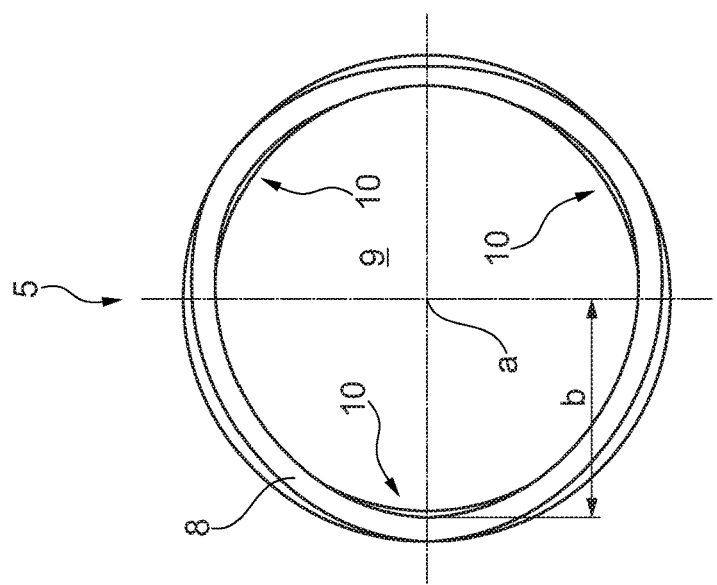
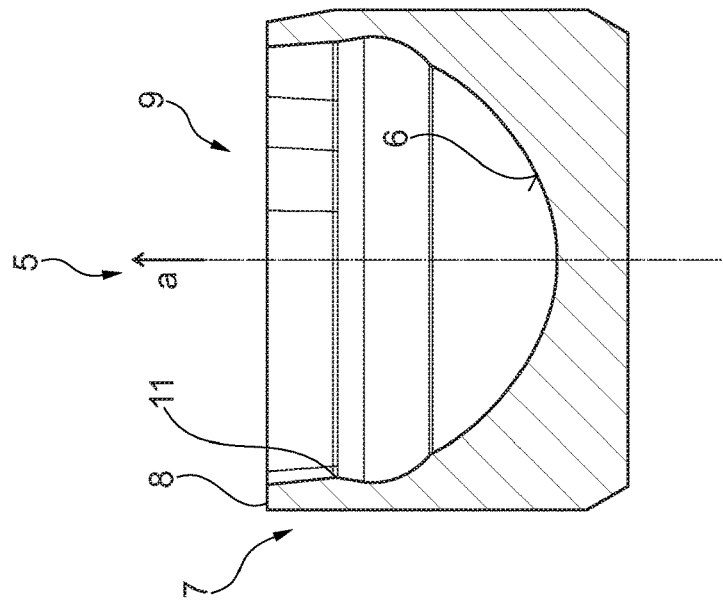
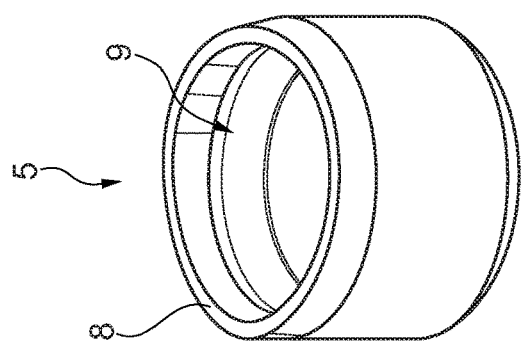

PIVOT BEARING OF A HYDRAULIC CLEARANCE COMPENSATION ELEMENT

INCORPORATION BY REFERENCE

The following documents are incorporated herein by reference as if fully set forth: German Patent Application No. 102016207175.0, filed Apr. 27, 2016.

FIELD OF THE INVENTION

The invention relates to a pivot bearing of a hydraulic clearance compensation element, especially of a valve train of an internal combustion engine, wherein the pivot bearing has a first part projecting in an axial direction with a surface that is convex at least in some sections and also a second part with a surface that is concave at least in some sections for the at least partial holding of the first p art.

BACKGROUND

A pivot bearing according to the class is known from DE 199 50 585 A1. DE 37 25 245 A1 and DE 195 05 406 A1 present similar solutions. The pivot bearing allows pivoting movements to be performed in the transmission of the movement, for example, of a rocker arm to a valve shaft.

The mentioned second part of the pivot bearing is here constructed, in particular, as a ball socket (so-called "elephant foot") that holds the first part preferably constructed as a ball in the housing of the hydraulic valve clearance compensation elements (HLA=Hydraulic Lash Adjuster), in order to compensate for clearance in the valve train of an internal combustion engine.

The pivot bearing functions as a joint consisting of a ball and ball socket and has the function of permitting all rotational degrees of motion and simultaneously being able to transfer high forces in translational movements. These forces transmit, for example, the reciprocating motion of the camshaft via a force-transmitting lever (e.g., rocker arm) to the valves in order to open these valves.

The defined movement of the valves is used primarily for exactly maintaining the gas exchange intervals in the combustion chamber and thus ultimately for trouble-free operation of the engine. The ball socket is to be mounted captively for the installation case on the housing of the clearance compensation element, so that, for reasons of easy installation and safe and reliable function, the ball socket is held in its position. The mount for the ball socket must have oil access for lubricating the ball-socket contact.

In valve trains, for hydraulic valve clearance compensation, a hydraulic support element is used. This can be installed both on the valve side and also on the cam side. It has, as mentioned, the balls for enabling angle compensation of the valve train. The connecting part in the form of the ball socket must be mounted captively on the ball, whereby it can be prevented, in particular, that components fall into the interior of the engine and cause damage there during assembly in the engine.

According to the previously known solutions mentioned above, it is known to press the balls against the socket and, in this way, to provide for a clearance-free interaction of the two parts. In this previously known, multi-part solution, a spring ring pulls the ball and socket against each other; the spring ring is here fixed, for example, in a groove that is machined in one of the parts.

In general, fixing the ball in the socket by a flange would also be conceivable. Here, the cross-sectional tapering of the socket required for the mount would then be generated after the force-free positioning of the ball in the socket.

For the previously known solutions, this causes considerable complexity in the production of the necessary components, which is cost-intensive accordingly.

SUMMARY

The present invention is based on the objective of constructing a pivot bearing according to the class such that the production of this pivot bearing is optimized and the costs associated with its production can be minimized. Furthermore, good lubrication of the sliding contact between the sliding partners should be provided.

The solution to achieving this object is characterized by the invention in that the first part is constructed at least partially as a ball, wherein the second part (that is, the socket) surrounds the ball with undercut in the axial direction.

In this way, the first part (that is, the ball) and the second part are free from plastic deformation after their production. This is understood to mean that the specified components are finished and are then subject to no plastic deformation (namely, flange formation).

The first part (that is, the ball) and the second part are preferably constructed as one-piece parts, wherein the ball is connected together with the second part in a kind of snap-fit connection to each other.

In this way, it is possible to simply join the two parts (ball and socket) with a pressing and snapping action.

The second part is preferably constructed in its area surrounding the ball with undercut as an interruption-free circumferential edge. Here it is preferably provided that the circumferential edge has a radial thickness that is between 3% and 10% of the diameter of the ball. The stated circumferential edge has a thin construction so that it can be easily deformed when joining the ball and socket.

The opening of the second part provided for holding the ball has, in an especially preferred way, a non-circular contour—viewed in the axial direction.

According to one preferred embodiment, the opening of the second part provided for holding the ball has, viewed in the axial direction, an elliptical contour. One alternative provides that the opening of the second part provided for holding the ball has, viewed in the axial direction, a contour that has a maximum distance from the axis at three or more positions, considered over the circumference of the opening; here, in an especially preferred way, the circumferential edge is constructed as a curve of constant width. The circumferential edge has, in this case, equal widths on all radial rays that intersect the axial direction (both with regard to the radial inner and also radial outer side of the circumferential edge).

In an especially preferred way it is provided that the length of the smallest inner circumference of the circumferential edge of the second part is greater than or equal to the length of the circumference of the ball. This makes it possible to realize the joining of the ball and socket with especially minimal and possibly damaging deformation, and nevertheless to produce a stable connection.

Accordingly, one essential aspect of the proposed solution provides that the part designated as the second part of the pivot bearing is snapped onto the ball, whereby the ball and socket are held together with a kind of snap-fit connection.

The further proposed construction with a partially non-circular opening produces the following essential advantage: because the second part of the pivot bearing, that is, the socket, for holding the socket, must be subjected to a heat treatment due to the requirements of wear resistance on the contact surfaces, only a small degree of elasticity of the material is available for the snapping action. Because this brittle material behavior in combination with the production tolerances of the first and second part of the pivot bearing (socket and ball) cannot guarantee a secure holding function through snapping action for a round construction of the opening of the socket, it is proposed that the shape of the socket to be pressed over is not round, but instead has a non-circular contour.

This contour can be selected flexibly. Conceivable are, for example, elliptical, star-shaped (similar to Torx®) or n-polygonal (similar to Inbus®) contours.

Here it is preferably provided that the length of the contour (i.e., the length of the minimum inner circumference of the circumferential edge of the second part) has at least the circumference of the ball and the non-circular contour is less than the diameter of the ball in at least one location. When snapping the ball into the socket, the structural elasticity introduced by the contour leads to the reversible deflection of the socket.

This produces an especially simple installation or removal of the pivot bearing through a tool-less snapping of the socket onto the ball.

A one-piece construction of the ball socket is possible, which enables economical production.

A narrow design of the ball socket with a small outer diameter is possible; this enables a high degree of freedom of motion of the ball socket in the tilting direction (for example, when arranging the clearance compensation element in the rocker arm).

Another advantageous possibility is non-cutting production as an extruded part with a high production rate.

Heat treatment processes for reducing wear on the contact surfaces can be used.

Finally, good oil access to the area between the ball and socket is realized, which increases the service life and reduces friction.

BRIEF DESCRIPTION OF THE DRAWINGS

Embodiments of the invention are shown in the figures. Shown are:

FIG. 3A is a perspective view of the second part of a pivot bearing according to a second embodiment of the invention, FIG. 3B is a radial section of the portion of the pivot bearing according to FIG. 3A, and FIG. 3C is a top view of the portion of the pivot bearing according to FIG. 3A.

DETAILED DESCRIPTION OF THE PREFERRED EMBODIMENTS

Figure 1:
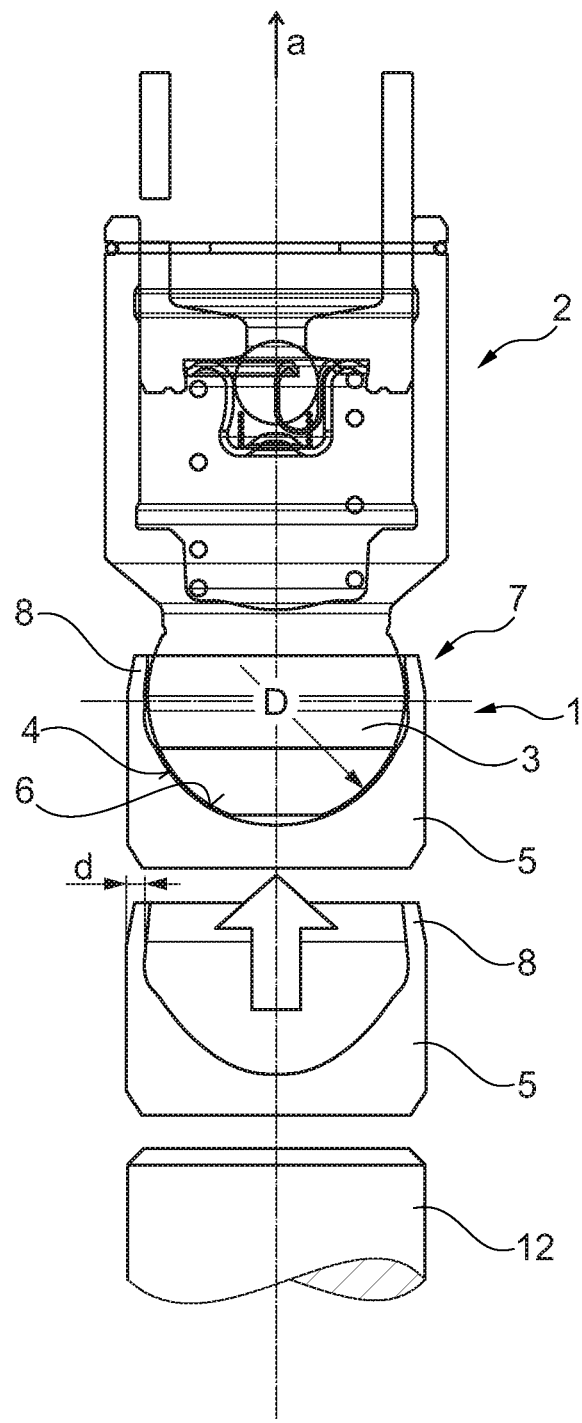
FIG. 1 is a view in a radial section, a clearance compensation element of a valve train of an internal combustion engine, wherein a second part (ball socket) of a pivot bearing is shown in a mounted position and in a not yet mounted position.

In FIG. 1, a clearance compensation element 2 of a valve train of an internal combustion engine is shown. Concerning the general construction of such a clearance compensation element and its use, reference is explicitly made to the previously known solutions mentioned above according to DE 199 50 585 A1, DE 37 25 245 A1 and DE 195 05 406 A1, both of which are incorporated herein by reference as if fully set forth. For actuating a valve shaft 12, the clearance compensation element 2 has, in its lower section, a pivot bearing 1 that includes a first part 3 in the form of a ball and a second part 5 in the form of a ball socket. The ball 3 has a convex surface 4 that is in sliding contact with the concave surface 6 of the ball socket 5 in the assembled state of the arrangement.

It is essential that the second part 5 surrounds the ball 3 with undercut in the axial direction a. Here, refer to an area 7 of the second part 5 that surrounds the ball 3 with undercut—viewed in the axial direction a.

Both the ball 3 and also the ball socket 5 are left free from plastic deformation after their production (i.e., after the cutting or non-cutting processing, heat treatment, and fine processing).

This applies especially also to the assembly process of the ball 3 and ball socket 5, in which both parts are moved toward each other and pressed together relative to each other in the axial direction a; this is indicated in FIG. 1 by the arrow.

So that the stated assembly process can take place without plastic deformation, a circumferential edge 8 that has a relatively thin construction is arranged on the ball socket 5. Recorded in FIG. 1 are the radial thickness d of the circumferential edge 8 and the diameter D of the ball 3. The radial thickness d of the circumferential edge 8 is here on the order of magnitude of 5% of the diameter D of the ball 3.

Accordingly, during the stated axial relative motion, the ball socket snaps onto the ball 3, so that a fixed connection between the two components 3 and 5 is produced.

Figure 2C:
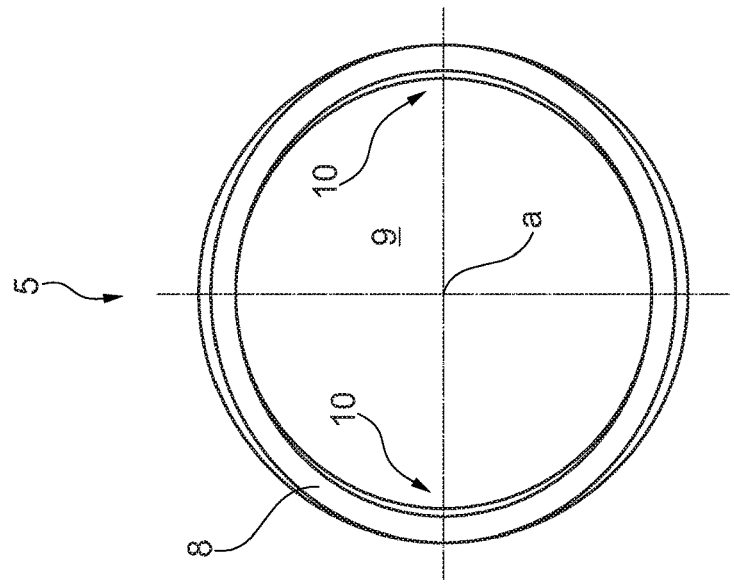
FIG. 2C is a top view of the section of the pivot bearing according to FIG. 2A.
Figure 2B:
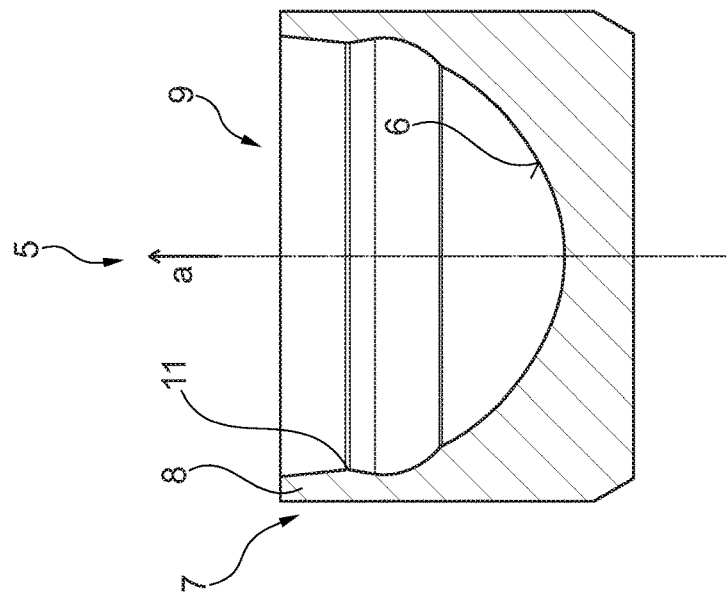
FIG. 2B is a radial section of the portion of the pivot bearing according to FIG. 2A.
Figure 2A:
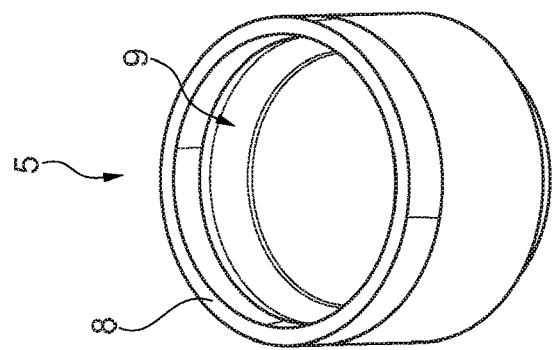
FIG. 2A is a perspective view of the second part of a pivot bearing according to a first embodiment of the invention.

To be able to perform the mentioned snapping process with especially minimal and possibly damaging deformation, preferred special measures are taken that are illustrated in FIGS. 2 and 3.

Here, in two different embodiments, the second part 5, that is, the ball socket, of the pivot bearing 1 is shown. For holding the ball 3, the ball socket 5 has an opening 9 in which the ball enters for assembling the two parts.

As given from the respective FIGS. 2C and 3C, the opening 9 does not have a circular construction, but instead a partially non-circular shape.

In the solution according to FIG. 2C, an elliptical shape is provided; from FIG. 3C it can be seen that the opening 9 has a contour with three areas especially far from the axis a. Recorded in FIG. 3c are three positions 10 in which the circumferential edge 8 has, with its radial inner surface, a maximum distance b from the axis a (in the elliptical solution according to FIG. 2C, these are, accordingly, two such positions 10).

If the length 11 (see FIGS. 2B and 3B) of the smallest inner circumference of the edge 8 is considered, it follows that this length is at least as large as the maximum ball circumference. Accordingly, in this case it is possible, in an especially simple way, to realize the snapping process of the ball socket 5 onto the ball 3, because to do this, only the non-circular contour has to be temporarily deformed into a circular contour, which can take place without plastic effects and thus is especially gentle on the materials.

The circumferential edge 8 is, in the case of the construction according to FIG. 3, preferably constructed as a curve of constant width, i.e., every diametrically opposed points of the contour have an equal distance from each other.

With the proposed construction, it is possible to realize the pivot bearing with very few parts that can be produced, in turn, relatively simply and economically.

LIST OF REFERENCE SYMBOLS

1 Pivot bearing
2 Clearance compensation element
3 First part (ball)
4 Convex surface
5 Second part (ball socket)
6 Concave surface
7 Area of second part with undercut
8 Circumferential edge
9 Opening of the second part
10 Position with maximum distance
11 Length of smallest internal circumference
12 Valve shaft
a Axial direction
d Radial thickness
D Diameter of the ball
b Maximum distance

The invention claimed is:

1. A pivot bearing of a hydraulic clearance compensation element, the pivot bearing comprising:
    a first part projecting in an axial direction (a) with a surface that is convex at least in some sections, the first part being partially formed as a ball, and
    a second part with a surface that is concave at least in some sections for at least partially holding the first part,
    the second part surrounds the ball with an undercut in the axial direction (a), and an opening of the second part provided for holding the ball has, viewed in the axial direction (a), a non-circular contour.

2. The pivot bearing according to claim 1, wherein the first part and the second part are free from plastic deformation after production.

3. The pivot bearing according to claim 1, wherein the first part and the second part each are constructed as one-piece parts and the first part is a ball that is connected together with the second part with a snap-fit connection.

4. The pivot bearing according to claim 3, wherein the second part is constructed in an area thereof surrounding the ball with an undercut as an interruption-free circumferential edge.

5. The pivot bearing according to claim 4, wherein the circumferential edge has a radial thickness (d) that is between 3% and 10% of a diameter (D) of the ball.

6. The pivot bearing according to claim 1, wherein the opening of the second part provided for holding the ball has, viewed in the axial direction (a), an elliptical contour.

7. The pivot bearing according to claim 1, wherein the opening of the second part provided for holding the ball has, viewed in the axial direction (a), a contour that has a maximum distance (b) from the axis (a) at three or more positions considered over a circumference of the opening.

8. The pivot bearing according to claim 7, wherein a circumferential edge of the second part is constructed as a curve of constant width.

9. The pivot bearing according to claim 8, wherein a length of a smallest internal circumference of the circumferential edge of the second part is greater than or equal to a length of a circumference of the ball.

10. The pivot bearing according to claim 1, wherein the pivot bearing forms a part of a valve train of an internal combustion engine.

11. The pivot bearing according to claim 1, wherein the opening of the second part, when viewed in the axial direction (a), has an asymmetrical profile.

* * * * *